United States Patent
Jimenez Garcia et al.

(10) Patent No.: US 10,544,249 B2
(45) Date of Patent: *Jan. 28, 2020

(54) METHOD FOR PREPARING AN AQUEOUS POLYMER DISPERSION

(71) Applicant: BASF SE, Ludwigshafen (DE)

(72) Inventors: Lucia Jimenez Garcia, Mannheim (DE); Juergen Blaul, Oftersheim (DE)

(73) Assignee: BASF SE, Ludwigshafen (DE)

( * ) Notice: Subject to any disclaimer, the term of this patent is extended or adjusted under 35 U.S.C. 154(b) by 218 days.

This patent is subject to a terminal disclaimer.

(21) Appl. No.: 15/303,313

(22) PCT Filed: Apr. 1, 2015

(86) PCT No.: PCT/EP2015/057146
§ 371 (c)(1),
(2) Date: Oct. 11, 2016

(87) PCT Pub. No.: WO2015/155085
PCT Pub. Date: Oct. 15, 2015

(65) Prior Publication Data
US 2017/0029545 A1    Feb. 2, 2017

(30) Foreign Application Priority Data
Apr. 11, 2014 (EP) ...................... 1416328

(51) Int. Cl.
*C08F 218/08* (2006.01)
*C08L 31/04* (2006.01)
*C09D 131/04* (2006.01)
*E04D 5/06* (2006.01)
*E04D 5/10* (2006.01)

(52) U.S. Cl.
CPC ............ *C08F 218/08* (2013.01); *C08L 31/04* (2013.01); *C09D 131/04* (2013.01); *E04D 5/06* (2013.01); *E04D 5/10* (2013.01); C08L 2201/54 (2013.01)

(58) Field of Classification Search
CPC .... C08F 218/08; C08L 31/04; C08L 2201/54; C09D 131/04; C09J 131/04; D06M 15/263; D06M 15/273; D06M 15/333; D06N 5/003; E04D 5/06; E04D 5/10

USPC ......................................................... 523/406
See application file for complete search history.

(56) References Cited

U.S. PATENT DOCUMENTS

| | | | |
|---|---|---|---|
| 2,520,959 A | 9/1950 | Powers | |
| 3,397,165 A | 8/1968 | Goodman et al. | |
| 4,269,749 A | 5/1981 | Marriott et al. | |
| 9,249,060 B2 | 2/2016 | Herold et al. | |
| 2013/0102702 A1* | 4/2013 | Hain | B01J 19/1862 523/402 |

FOREIGN PATENT DOCUMENTS

| | | | | |
|---|---|---|---|---|
| CN | 103124708 A | 5/2013 | | |
| DE | 40 03 422 A1 | 8/1991 | | |
| DE | 196 24 299 A1 | 1/1997 | | |
| DE | 196 21 027 A1 | 11/1997 | | |
| DE | 197 41 184 A1 | 3/1999 | | |
| DE | 197 41 187 A1 | 3/1999 | | |
| DE | 198 05 122 A1 | 4/1999 | | |
| DE | 198 28 183 A1 | 12/1999 | | |
| DE | 198 39 199 A1 | 3/2000 | | |
| DE | 198 40 586 A1 | 3/2000 | | |
| DE | 198 47 115 C1 | 5/2000 | | |
| DE | 102010031339 A1 * | 1/2012 | .......... | B01J 19/1862 |
| EP | 0 771 328 A1 | 5/1997 | | |
| GB | 1 363 432 A | 8/1974 | | |
| WO | 95/33775 A1 | 12/1995 | | |
| WO | 2008/150647 A1 | 12/2008 | | |
| WO | 2011/131279 A1 | 10/2011 | | |
| WO | 2013/045259 A1 | 4/2013 | | |
| WO | WO-2013088188 A1 * | 6/2013 | ....... | C09D 123/0869 |
| WO | 2013/120752 A1 | 8/2013 | | |
| WO | 2013/124417 A1 | 8/2013 | | |

OTHER PUBLICATIONS

International Search Report dated Jul. 21, 2015 in PCT/EP2015/057146 filed Apr. 1, 2015.

* cited by examiner

*Primary Examiner* — David T Karst
(74) *Attorney, Agent, or Firm* — Oblon, McClelland, Maier & Neustadt, L.L.P.

(57) ABSTRACT

Aqueous polymer dispersions and their use for producing shaped articles having improved heat resistance are described.

14 Claims, No Drawings

METHOD FOR PREPARING AN AQUEOUS POLYMER DISPERSION

The present invention provides a process for producing an aqueous dispersion of a polymer P by free-radically initiated aqueous emulsion polymerization of ethylenically unsaturated compounds, which comprises using

| | |
|---|---|
| ≥0.1 and ≤5.0 wt % | of at least one α,β-monoethylenically unsaturated $C_3$ to $C_6$ mono- or dicarboxylic acid (monomers A), |
| ≥0.1 and ≤10 wt % | of at least one monoethylenically unsaturated compound having at least one epoxy group (monomers B), |
| ≥0.1 and ≤5.0 wt % | of at least one monoethylenically unsaturated compound having at least one sulfonic acid group (monomers C), |
| ≥70 and ≤95 wt % | of at least one ester formed from vinyl alcohol and a $C_1$ to $C_5$ monocarboxylic acid (monomers D), and |
| ≥0 and ≤25 wt % | of at least one ethylenically unsaturated compound other than said monomers A to D (monomers E), | wherein the amounts of monomers A to E sum to 100 wt %, for the polymerization.

The present invention further relates to the aqueous polymer dispersions obtainable by the process of the present invention, to the use of these aqueous polymer dispersions as binders for granular and/or fibrous substrates, to the shaped articles obtained therefrom and also to the use of these shaped articles in the manufacture of bituminized roofing membranes.

WO 2011/131279, which discloses inter alia aqueous mineral wool fiber mat binders comprising emulsion polymers functionalized with epoxy groups and/or carboxyl groups and also an amine and/or amine derivative as crosslinker, and also the prior art cited therein is viewed as essential prior art.

Prior art aqueous binders are disadvantageous in needing amines and/or amine derivatives as crosslinkers.

The problem addressed by the present invention was therefore that of providing aqueous binders for granular and/or fibrous substrates that have no need of amines and/or amine derivatives and can be used to produce shaped articles having a high level of heat resistance.

The problem was solved by the aqueous polymer dispersions obtained as per the process recited at the beginning.

Monomers A may be any α,β-monoethylenically unsaturated $C_3$ to $C_6$, preferably $C_3$ or $C_4$ mono-or dicarboxylic acids, for example acrylic acid, methacrylic acid, ethylacrylic acid, itaconic acid, allylacetic acid, crotonic acid, vinylacetic acid, fumaric acid, maleic acid, 2-methylmaleic acid. But monomers A also include the anhydrides of corresponding α,β-monoethylenically unsaturated dicarboxylic acids, for example maleic anhydride or 2-methylmaleic anhydride. Monomer A is preferably selected from the group comprising acrylic acid, methacrylic acid, crotonic acid, fumaric acid, maleic acid, maleic anhydride, 2-methylmaleic acid and itaconic acid, while acrylic acid, methacrylic acid and/or itaconic acid are particularly preferable. It will be appreciated that monomers A also include the fully or partially neutralized water-soluble salts, especially the alkali metal or ammonium salts, of the aforementioned acids.

The amount of monomer A used for producing polymer P is ≥0.1 and ≤5.0 wt %, preferably ≥0.5 and ≤4.0 wt % and more preferably ≥0.5 and ≤3.0 wt %.

Monomers B may be any monoethylenically unsaturated compounds having at least one epoxy group. Examples of monomers B are vinyloxirane, allyloxirane, glycidyl acrylate and/or glycidyl methacrylate. The at least one monomer B is advantageously selected from the group comprising vinyloxirane, allyloxirane, glycidyl acrylate and glycidyl methacrylate. It is particularly advantageous to use glycidyl acrylate and/or glycidyl methacrylate, while glycidyl methacrylate is particularly preferable.

The amount of monomer B used for producing polymer P is ≥0.1 and ≤10 wt %, preferably ≥2.0 and ≤8.0 wt % and more preferably ≥3.0 and ≤7.0 wt %.

Monomers C may be any monoethylenically unsaturated compounds having at least one sulfonic acid group, for example vinylsulfonic acid, allylsulfonic acid, styrenesulfonic acid or 2-acrylamido-2-methylpropanesulfonic acid. It is particularly advantageous to use vinylsulfonic acid and/or 2-acrylamido-2-methylpropanesulfonic acid, while vinylsulfonic acid is particularly preferable. It will be appreciated that monomers C also include the fully or partially neutralized salts, especially the alkali metal or ammonium salts, of the aforementioned acids.

The amount of monomer C used for producing polymer P is ≥0.1 and ≤5.0 wt %, preferably ≥0.1 and ≤1.5 wt % and more preferably ≥0.1 and ≤1.0 wt %.

Useful monomers D for the purposes of the present invention include any esters formed from vinyl alcohol and a $C_1$ to $C_5$ monocarboxylic acid, such as formic acid, acetic acid, propionic acid, butyric acid, 2-methylpropionic acid, valeric acid or pivalic acid. It is advantageous to use vinyl acetate and/or vinyl propionate, while vinyl acetate is particularly preferable.

The amount of monomer D used for producing polymer P is ≥70 and ≤95 wt %, preferably ≥75 and ≤85 wt % and more preferably ≥78 and ≤83 wt %.

Useful monomers E include any free-radically polymerizable ethylenically unsaturated compounds other than monomers A to D. It is advantageous for the at least one monomer E to be selected from the group comprising olefins, for example ethene, propene or 1-butene, conjugated aliphatic $C_4$ to $C_9$ diene compounds, such as 1,3-butadiene or isoprene, esters formed from vinyl alcohol and a $C_6$ to $C_{18}$ monocarboxylic acid, such as vinyl laurate, vinyl 2-ethylhexanoate or vinyl versatate, $C_1$ to $C_{10}$ alkyl acrylates, such as ethyl acrylate, n-butyl acrylate or 2-ethylhexyl acrylate, $C_1$ to $C_{10}$ alkyl methacrylates, such as methyl methacrylate, ethyl methacrylate, n-butyl methacrylate or n-hexyl methacrylate, $C_5$ to $C_{10}$ cycloalkyl acrylates and methacrylates, such as cyclopentyl acrylate, cyclopentyl methacrylate, cyclohexyl acrylate or cyclohexyl methacrylate, $C_1$ to $C_{10}$ dialkyl maleates and $C_1$ to $C_{10}$ dialkyl fumarates, such as dimethyl maleate or dimethyl fumarate, vinylaromatic monomers, such as styrene, α-methylstyrene, 2-, 3- or 4-methylstyrene, o- or p-vinyltoluene or p-acetoxystryrene, mono- or dinitriles of an ethylenically unsaturated $C_3$ to $C_6$ mono- or dicarboxylic acid, such as acrylonitrile or methacrylonitrile, and mono- or dicarboxamides of an ethylenically unsaturated $C_3$ to $C_6$ mono- or dicarboxylic acid, such as acrylamide or methacrylamide.

Useful monomers E, as will be appreciated, further include other ethylenically unsaturated compounds, for example those having at least two nonconjugated ethylenically unsaturated groups. Examples thereof are monomers comprising two vinyl radicals, monomers comprising two vinylidene radicals and also monomers comprising two alkenyl radicals. Of particular advantage here are the diesters of dihydric alcohols with α,β-monoethylenically unsaturated monocarboxylic acids, of which acrylic acid and methacrylic acid are preferable. Examples of such monomers comprising two nonconjugated ethylenically unsaturated double bonds include alkylene glycol diacrylates and dimethacrylates, such as ethylene glycol diacrylate, 1,2-propylene glycol diacrylate, 1,3-propylene glycol diacrylate, 1,3-butylene glycol diacrylate, 1,4-butylene glycol diacrylate and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, triesters of trihydric alcohols with α,β-monoethylenically unsaturated monocarboxylic acids, for example glycerol triacrylate, glycerol trimethacrylate, trimethylol propane triacrylate, trimethylol propane trimethacrylate, and also divinylbenzene, vinyl methacrylate, vinyl acrylate, allyl methacrylate, allyl acrylate, diallyl maleate, diallyl fumarate, methylenebisacrylami de, cyclopentadienyl acrylate, triallyl cyanurate or triallyl isocyanurate. 1,4-Butylene glycol diacrylate, allyl methacrylate and/or divinylbenzene are particularly preferable.

Useful monomers E further include any monoethylenically unsaturated compounds comprising a silane group. It is particularly advantageous for these monomers E to have a hydrolyzable silane group. Hydrolyzable silane groups advantageously comprise at least an alkoxy group or a halogen atom, for example chlorine. Monomers E advantageously useful for the purposes of the present invention are disclosed in WO 2008/150647, page 9 lines 5 to 25. These monomers are hereby expressly incorporated in the present description by reference. It is particularly advantageous to use 3-methacryloyloxypropyltrimethoxysilane, 3-methacryloyloxypropyl-triethoxysilane, vinyltriacetoxysilane and/or vinylethoxydimethoxysilane. These monomers E are often preferably used when inorganic granular and/or fibrous substrates, in particular glass fibers or mineral fiber for example asbestos or rock wool, are to be bonded.

The amount of monomer E used for producing polymer P is ≥0 and ≤25 wt %, preferably ≥0.1 and ≤20 wt % and more preferably ≥5.0 and ≤15 wt %.

In one preferred embodiment, the process for producing polymer P in the manner of the present invention comprises using

| | |
|---|---|
| ≥0.5 and ≤4.0 wt % | of at least one monomer A, |
| ≥2.0 and ≤8.0 wt % | of at least one monomer B, |
| ≥0.1 and ≤1.5 wt % | of at least one monomer C, |
| ≥75 and ≤85 wt % | of at least one monomer D, and |
| ≥0.1 and ≤20 wt % | of at least one monomer E | while a particularly preferred embodiment of the process for producing polymer P in the manner of the present invention utilizes

| | |
|---|---|
| ≥0.5 and ≤3.0 wt % | of at least one monomer A, |
| ≥3.0 and ≤7.0 wt % | of at least one monomer B, |
| ≥0.1 and ≤1.0 wt % | of at least one monomer C, |
| ≥78 and ≤83 wt % | of at least one monomer D, and |
| ≥5.0 and ≤15 wt % | of at least one monomer E. |

In one embodiment of the process for producing an aqueous dispersion of a polymer P in the manner of the present invention, acrylic acid and/or methacrylic acid are used as monomers A, glycidyl acrylate and/or glycidyl methacrylate as monomers B, vinylsulfonic acid as monomer C, vinyl acetate as monomer D and n-butyl acrylate and/or 2-ethylhexyl acrylate as monomers E.

In one preferred embodiment, therefore, the process for producing an aqueous dispersion of a polymer P in the manner of the present invention comprises using

| | |
|---|---|
| ≥0.5 and ≤3.0 wt % | of acrylic acid and/or methacrylic acid, |
| ≥3.0 and ≤7.0 wt % | of glycidyl acrylate and/or glycidyl methacrylate, |
| ≥0.1 and ≤1.0 wt % | of vinylsulfonic acid, |
| ≥78 and ≤83 wt % | of vinyl acetate, and |
| ≥5.0 and ≤15 wt % | of n-butyl acrylate and/or 2-ethylhexyl acrylate. |

The conduct of free-radically initiated emulsion polymerizations of ethylenically unsaturated monomers in an aqueous medium has been extensively described and therefore is well known to a person skilled in the art (cf. emulsion polymerization in Encyclopedia of Polymer Science and Engineering, Vol. 8, pages 659 ff. (1987); D. C. Blackley, in High Polymer Lattices, Vol. 1, pages 35 ff. (1966); H. Warson, The Applications of Synthetic Resin Emulsions, chapter 5, pages 246 it (1972); D. Diederich, Chemie in unserer Zeit 24, pages 135 to 142 (1990); Emulsion Polymerisation, Interscience Publishers, New York (1965); DE-A 40 03 422 and Dispersionen synthetischer Hochpolymerer, F. Hölscher, Springer-Verlag, Berlin (1969)). The free-radically initiated aqueous emulsion polymerization is typically carried out by the ethylenically unsaturated monomers being dispersed, generally by use of dispersing assistants, such as emulsifiers and/or protective colloids, in an aqueous medium and polymerized using at least one water-soluble free-radical polymerization initiator. Frequently, the residual fractions of unconverted ethylenically unsaturated monomers in the aqueous polymer dispersions obtained are reduced using chemical and/or physical methods likewise known to a person skilled in the art [see for example EP-A 771328, DE-A 19624299, DE-A 19621027, DE-A 19741184, DE-A 19741187, DE-A 19805122, DE-A 19828183, DE-A 19839199, DE-A 19840586 and 19847115], the polymer solids content is adjusted to a desired value by diluting or concentrating, or the aqueous polymer dispersion has added to it further customarily added substances, for example bactericidal foam- or viscosity-modifying additives. The only difference between this general procedure and that used to produce an aqueous dispersion of polymer P is, with the latter, the specific use of the aforementioned monomers A to E. As will be appreciated in this connection, the procedure used to produce polymer P in the context of the present invention shall also comprehend the seed, staged and gradient modes familiar to a person skilled in the art.

The polymer P is obtainable in the aqueous dispersion of the present invention as an aqueous polymer P dispersion by initially charging the total amount of monomers A to E (total monomers) in the aqueous reaction medium before initiating the polymerization reaction. However, it is also possible to optionally merely initially charge a portion of monomers A to E in the aqueous reaction medium before initiating the polymerization reaction and then, after initiating polymerization, to add the total amount or, as may be, the remaining quantity under polymerization conditions during the free-radical emulsion polymerization at the rate of consumption, continuously with constant or varying flow rates, or discontinuously. Monomers A to E may be dosed here as separate individual streams, as homogeneous or inhomogeneous (partial) mixtures, or as a monomer emulsion. Advantageously, monomers A to E are dosed in the form of a homogeneous monomer mixture, more particularly in the form of an aqueous monomer emulsion.

Dispersing assistants are typically also used to produce the aqueous polymer P dispersion used for the purposes of the present invention to ensure disperse distribution in the aqueous medium not only of the monomer droplets but also of the polymer corpuscles formed and thus ensure that the aqueous polymer P dispersion produced is stable. Dispersing assistants to be considered for use include protective colloids of the kind typically used for conducting free-radical aqueous emulsion polymerizations as well as emulsifiers.

Suitable protective colloids include, for example, polyvinyl alcohols, polyalkylene glycols, alkali metal salts of polyacrylic acids and polymethacrylic acids, gelatin derivatives or acrylic acid, methacrylic acid, maleic anhydride, 2-acrylamido-2-methylpropanesulfonic acid and/or 4-styrenesulfonic acid-containing copolymers and their alkali metal salts but also N-vinyl-pyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-bearing acrylates, methacrylates, acrylamides and/or methacrylamides-containing homo- and copolymers. An extensive description of further suitable protective colloids is found in Houben-Weyl, Methoden der organischen Chemie, volume XIV/1, Makromolekulare Stoffe, Georg-Thieme-Verlag, Stuttgart, 1961, pages 411 to 420.

It will be appreciated that mixtures of emulsifiers and/or protective colloids may also be used. The dispersing assistants used are frequently all emulsifiers whose relative molecular weights are typically below 1000, in contradistinction to protective colloids. Emulsifiers may be not only anionic or cationic but also nonionic. It will be appreciated that when mixtures of surface-active substances are used, the individual components need to be compatible with each other, as may be verified in cases of doubt by performing a few preliminary tests. The general rule is that anionic emulsifiers are compatible with each other and with nonionic emulsifiers. The same holds for cationic emulsifiers, whereas anionic and cationic emulsifiers are usually incompatible with each other. An overview of suitable emulsifiers is found in Houben-Weyl, Methoden der organischen Chemie, volume XIV/1, Makromolekulare Stoffe, Georg-Thieme-Verlag, Stuttgart, 1961, pages 192 to 208.

Especially emulsifiers are used as dispersing assistants, however.

The customary nonionic emulsifiers include, for example, ethoxylated mono-, di- and trialkylphenols (degree of ethoxylation: 3 to 50, alkyl size: $C_4$ to $C_{12}$) and also ethoxylated fatty alcohols (degree of ethoxylation: 3 to 80; alkyl size: $C_8$ to $C_{36}$). Examples thereof are the Lutensol® A brands ($C_{12}C_{14}$ fatty alcohol ethoxylates, degree of ethoxylation: 3 to 8), Lutensol® AO brands ($C_{13}C_{15}$ oxo process alcohol oxylates, degree of ethoxylation: 3 to 30), Lutensol® AT brands ($C_{16}C_{18}$ fatty alcohol ethoxylates, degree of ethoxylation: 11 to 80), Lutensol® ON brands ($C_{10}$ oxo process alcohol ethoxylates, degree of ethoxylation: 3 to 11) and the Lutensol® TO brands ($C_{13}$ oxo process alcohol ethoxylates, degree of ethoxylation: 3 to 20) from BASF SE.

Customary anionic emulsifiers include, for example, alkali metal and ammonium salts of alkyl sulfates (alkyl size: $C_8$ to $C_{12}$), of sulfuric monoesters of ethoxylated alkanols (degree of ethoxylation: 4 to 30, alkyl size: $C_{12}$ to $C_{18}$) and of ethoxylated alkylphenols (degree of ethoxylation: 3 to 50, alkyl size: $C_4$ to $C_{12}$), of alkylsulfonic acids (alkyl size: $C_{12}$ to $C_{18}$) and of alkylarylsulfonic acids (alkyl size: $C_9$ to $C_{18}$).

Useful anionic emulsifiers further include compounds of general formula (I)

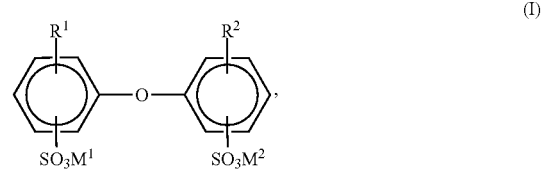

where $R^1$ and $R^2$ are each an H atom or $C_4$ to $C_{24}$ alkyl but may not both be an H atom, and $M^1$ and $M^2$ may be alkali metal ions and/or ammonium ions. $R^1$ and $R^2$ in general formula (I) are preferably linear or branched alkyl radicals of 6 to 18 carbon atoms, in particular 6, 12 and 16 carbon atoms, or hydrogen, with the proviso that $R^1$ and $R^2$ may not both be an H atom. $M^1$ and $M^2$ are preferably sodium, potassium or ammonium, of which sodium is particularly preferable. Particularly advantageous compounds (I) have $M^1$ and $M^2$ both sodium, $R^1$ branched alkyl of 12 carbon atoms and $R^2$ an H atom or $R^1$. Technical-grade mixtures frequently used comprise from 50 to 90 wt % of the monoalkylated product, for example Dowfax® 2A1 (trademark of Dow Chemical Company). Compounds (I) are commonly/generally known, for example from U.S. Pat. No. 4,269,749, and are commercially available.

Suitable cation-active emulsifiers are generally $C_6$ to $C_{18}$ alkyl-, alkylaryl- or heterocyclyl-containing primary, secondary, tertiary or quaternary ammonium salts, alkanolammonium salts, pyridinium salts, imidazolinium salts, oxazolinium salts, morpholinium salts, thiazolinium salts and also salts of amine oxides, quinolinium salts, isoquinolinium salts, tropylium salts, sulfonium salts and phosphonium salts. Examples are dodecylammonium acetate or the corresponding sulfate, the sulfates or acetates of various 2-(N,N,N-trimethylammonium)ethyl paraffinic acid esters, N-cetylpyridinium sulfate, N-laurylpyridinium sulfate and also N-cetyl-N,N,N-trimethylammonium sulfate, N-dodecyl-N,N,N-trimethylammonium sulfate, N-octyl-N,N,N-trimethylammonium sulfate, N,N-distearyl-N,N-dimethylammonium sulfate and also the Gemini surfactant N,N'-(lauryldimethyl) ethylenediamine disulfate, ethoxylated tallowalkyl N-methyl-ammonium sulfate and ethoxylated oleylamine (for example Uniperol® AC from BASF SE, about 11 ethylene oxide units). Numerous further examples are found in H. Stache, Tensid-Taschenbuch, Carl-Hanser-Verlag, Munich, Vienna, 1981 and in McCutcheon's, Emulsifiers & Detergents, MC Publishing Company, Glen Rock, 1989. It is beneficial when the anionic counter-groups have very low nucleophilicity, as for example with perchlorate, sulfate, phosphate, nitrate and carboxylates, for example acetate, trifluoroacetate, trichloroacetate, propionate, oxalate, citrate, benzoate, and also conjugated anions of organosulfonic acids, for example methylsulfonate, trifluoromethylsulfonate and para-toluenesulfonate, further tetrafluoroborate, tetraphenyl borate, tetrakis(pentafluorophenyl)borate, tetrakis[bis(3,5-trifluoro-methyl)phenyl]borate, hexafluorophosphate, hexafluoroarsenate or hexafluoroantimonate.

Emulsifiers preferred for use as dispersing assistants are advantageously used in an overall amount ≥0.005 and ≤10 wt %, preferably ≥0.01 and ≤5 wt %, especially ≥0.1 and ≤3 wt %, all based on total monomers.

The overall amount of the protective colloids used as dispersing assistants in addition to or in lieu of emulsifiers is often ≥0.1 and ≤40 wt % and frequently ≥0.2 and ≤25 wt %, all based on total monomers.

Preferably, however, it is anionic and/or nonionic emulsifiers that are used as dispersing assistants.

The aqueous polymers P dispersion of the present invention is obtainable by initially charging the overall amount of dispersing assistant in the aqueous reaction medium before initiating the polymerization reaction. However it is also possible to optionally merely initially charge a portion of the dispersing assistant in the aqueous reaction medium before initiating the polymerization reaction and then to add the overall amount or as the case may be any remaining quantity of the dispersing assistant under polymerization conditions during the free-radical emulsion polymerization, continuously or batchwise. Preferably, the main or overall quantity of dispersing assistant is added in the form of an aqueous monomer emulsion.

The free-radically initiated aqueous emulsion polymerization is initiated using a free-radical polymerization initiator. Peroxides and azo compounds may both be concerned here in principle. Redox initiator systems, as will be appreciated, may also be used. Useful peroxides include in principle inorganic peroxides, such as hydrogen peroxide or peroxodisulfates, such as the mono- or di-alkali metal or ammonium salts of peroxodisulfuric acid, for example the mono- and di-sodium, -potassium or ammonium salts thereof, or organic peroxides, such as alkyl hydroperoxides, for example tert-butyl, p-mentyl or cumyl hydroperoxide, and also dialkyl or diaryl peroxides, such as di-tert-butyl or dicumyl peroxide. The azo compounds used are essentially 2,2'-azobis(isobutyronitrile), 2,2'-azobis(2,4-dimethylvaleronitrile) and 2,2'-azobis(amidinopropyl) dihydrochloride (AIBA, corresponds to V-50 from Wako Chemicals). The oxidizing agents for redox initiator systems are essentially selected from the abovementioned peroxides. The corresponding reducing agents may be sulfur compounds of low oxidation state, such as alkali metal sulfites, for example potassium and/or sodium sulfite, alkali metal hydrogensulfites, for example potassium and/or sodium hydrogensulfite, alkali metal metabisulfites, for example potassium and/or sodium metabisulfite, formaldehyde sulfoxylates, for example potassium and/or sodium formaldehyde sulfoxylate, alkali metal salts, specifically potassium and/or sodium salts, of aliphatic sulfinic acids and alkali metal hydrogensulfides, for example potassium and/or sodium hydrogensulfide, salts of polyvalent metals, such as iron(II) sulfate, iron(II) ammoniosulfate, iron(II) phosphate, enediols, such as dihydroxymaleic acid, benzoin and/or ascorbic acid, and also reducing saccharides, such as sorbose, glucose, fructose and/or dihydroxyacetone. The amount of free-radical initiator used, based on total monomers, is generally in the range from 0.01 to 5 wt %, preferably in the range from 0.1 to 3 wt % and more preferably in the range from 0.2 to 1.5 wt %.

The aqueous polymers P dispersion of the present invention is obtainable by initially charging the overall amount of free-radical initiator in the aqueous reaction medium before initiating the polymerization reaction. However, it is also possible to optionally initially charge merely a portion of the free-radical initiator in the aqueous reaction medium before initiating the polymerization reaction and then to add the overall amount or as the case may be the remaining quantity under polymerization conditions during the free-radical emulsion polymerization at the rate of consumption, continuously or discontinuously.

Initiating the polymerization reaction refers to starting the polymerization reaction of the monomers in the polymerization vessel after free-radical formation on the part of the free-radical initiator. The polymerization reaction may be initiated by admixture of free-radical initiator to the aqueous polymerization mixture in the polymerization vessel under polymerization conditions. However, it is also possible for the admixture of some or all of the free radical initiator to the aqueous polymerization mixture comprising the initially charged monomers, in the polymerization vessel, to take place under conditions which are not suitable for initiating a polymerization reaction, for example at low temperature, and for polymerization conditions to be established in the aqueous polymerization mixture thereafter. Polymerization conditions are generally those temperatures and pressures under which the free-radically initiated aqueous emulsion polymerization proceeds at a sufficient rate of polymerization. They are more particularly dependent on the free-radical initiator used. Advantageously, free-radical initiator type and quantity, the polymerization temperature and the polymerization pressure are selected such that the free-radical initiator has a half-life <3 hours, more advantageously <1 hour and even more advantageously <30 minutes, while sufficient starting free-radicals are available at all times in order that the polymerization reaction may be initiated and maintained.

The entire range from 0 to 170° C. may be considered for the reaction temperature of the free-radical aqueous emulsion polymerization. Temperatures employed are generally in the range from 50 to 120° C., preferably in the range from 60 to 110° C. and more preferably in the range from 60 to 100° C. The free-radical aqueous emulsion polymerization may be carried out at a pressure below, equal to or above 1 atm [1.013 bar (absolute), atmospheric pressure], so the polymerization temperature may exceed 100° C. and range up to 170° C. In the presence of monomers A to E having a low boiling point, the emulsion polymerization is preferably carried out under elevated pressure. The pressure may in fact be 1.2, 1.5, 2, 5, 10 or 15 bar (absolute) or may assume still higher values. Pressure settings for an emulsion polymerization under reduced pressure are 950 mbar, frequently 900 mbar and often 850 mbar (absolute). The free-radical aqueous emulsion polymerization is advantageously carried out at 1 atm in the absence of oxygen, more particularly under inert gas blanketing, as under nitrogen or argon for example.

The aqueous reaction medium may also in principle comprise minor amounts (<5 wt %) of water-soluble organic solvents, for example methanol, ethanol, isopropanol, butanols, pentanols, but also acetone etc. Preferably, however, the process of the invention is carried out without such solvents.

In addition to the aforementioned components, chain transfer agents may optionally also be used during the emulsion polymerization in order to reduce/police the molecular weight of the polymers P obtainable by the polymerization. Chain transfer agents used in this context include essentially aliphatic and/or araliphatic halogen compounds, for example n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, for example ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomeric compounds, n-octanethiol and its isomeric compounds, n-nonanethiol and its isomeric compounds, n-decanethiol and its isomeric compounds, n-undecanethiol and its isomeric compounds, n-dodecanethiol and its isomeric compounds, n-tridecanethiol and its isomeric compounds, substituted thiols, for example 2-hydroxyethanethiol, aromatic thiols, such as benzenethiol, ortho-, meta- or para-methylbenzenethiol, and also any further sulfur compounds described in the Polymer Handbook 3rd edition, 1989, J. Brandrup and E. H. Immergut, John Wiley & Sons, section II, pages 133 to 141, but also aliphatic and/or aromatic aldehydes, such as acetaldehyde, propionaldehyde and/or benzaldehyde, unsaturated fatty acids, such as oleic acid, dienes having nonconjugated double bonds, such as divinylmethane or vinylcyclohexane or hydrocarbons having easily abstracted hydrogen atoms, for example toluene. But it is also possible to use mixtures of nondisruptive aforementioned chain transfer agents.

The total amount of chain transfer agents which is optionally used in the dispersion emulsion polymerization of the present invention is generally <5 wt %, often <3 wt % and frequently <1 wt %, all based on total monomers.

It is beneficial when all or some of the optionally used chain transfer agent is added to the aqueous reaction medium prior to initiating the free-radical polymerization. In addition, all or some of the chain transfer agent may advantageously be added to the aqueous reaction medium together with monomers A to E during the polymerization.

The polymers P obtained by the process of the present invention may in principle have glass transition temperatures Tg in the range of ≥−70 and ≤150° C. Monomers A to E are advantageously chosen in terms of type and amount such that the product polymers P have a glass transition temperature Tg in the range of ≥−10 and ≤70° C. and advantageously ≥5 and ≤50° C. and more advantageously in the range ≥20 and ≤40° C. Glass transition temperature Tg herein is to be understood as referring to the midpoint temperature of ISO 11357-2, as determined by differential scanning calorimetry (DSC; heating rate 20 K/minute) [cf. also Ullmann's Encyclopedia of Industrial Chemistry, page 169, Verlag Chemie, Weinheim, 1992 and Zosel in Farbe und Lack, 82, pages 125 to 134, 1976].

According to Fox (T. G. Fox, Bull. Am. Phys. Soc. 1956 [Ser. II] 1, page 123 and as per Ullmann's Encyclopädie der technischen Chemie, vol. 19, page 18, 4$^{th}$ edition, Verlag Chemie, Weinheim, 1980), the glass transition temperature of not more than but lightly crosslinked interpolymers is given to good approximation by:

$$1/Tg = x1/Tg1 + x2/Tg2 + \ldots xn/Tgn,$$

where x1, x2, ... xn are the mass fractions of monomers 1, 2, ... n and Tg1, Tg2, ... Tgn are the glass transition temperatures in degrees Kelvin of the respective homopolymers of said monomers 1, 2, ... n. The glass transition temperatures of these homopolymers of most ethylenically unsaturated monomers are known (or are simple to determine experimentally in a conventional manner) and are listed for example in J. Brandrup, E. H. Immergut, Polymer Handbook 1st Ed. J. Wiley, New York, 1966, 2nd Ed. J. Wiley, New York, 1975 and 3rd Ed. J. Wiley, New York, 1989, and also in Ullmann's Encyclopedia of Industrial Chemistry, page 169, Verlag Chemie, Weinheim, 1992.

It is essential that the free-radically initiating aqueous emulsion polymerization may also be carried out in the presence of a polymer seed, for example in the presence of 0.01 to 3 wt %, frequently of 0.02 to 2 wt % and often of 0.04 to 1.5 wt % of a polymer seed, all based on total monomers.

A polymer seed is used in particular when the corpuscle size of the polymer particles to be attained by free-radical aqueous emulsion polymerization is to be set to a specific value (see for example U.S. Pat. Nos. 2,520,959 and 3,397,165).

One polymer seed used in particular has polymer seed particles with a narrow corpuscle size distribution and weight average diameters Dw ≤100 nm, frequently ≥5 nm to ≤50 nm and often ≥15 nm to ≤35 nm. Weight average corpuscle diameter determination is known to a person skilled in the art and is done using the analytical ultracentrifuge method for example. Weight average corpuscle diameter herein is to be understood as being the weight average Dw50 value determined by the analytical ultracentrifuge method (cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175).

Narrow corpuscle size distribution herein is to be understood as meaning that the ratio of the analytical ultracentrifuge method weight average particle diameters Dw50 and number-average particle diameters DN50 [Dw50/DN50] <2.0, preferably <1.5 and more preferably <1.2 or <1.1.

The polymer seed is typically used in the form of an aqueous polymer dispersion. The aforementioned quantitative particulars are based on the polymer solids content of the aqueous polymer seed dispersion.

When a polymer seed is used, it is advantageous to employ an exogenous polymer seed. Unlike an in situ polymer seed, which is prepared in the reaction vessel before the actual emulsion polymerization is commenced, and which generally has the same monomeric composition as the polymer prepared by the ensuing free-radically initiated aqueous emulsion polymerization, an exogenous polymer seed is a polymer seed which has been prepared in a separate reaction step and the monomeric composition of which differs from that of the polymer prepared by the free-radically initiated aqueous emulsion polymerization, although this means nothing more than that different monomers, or monomer mixtures having a differing composition, are used for preparing the exogenous polymer seed and for preparing the aqueous polymer dispersion. Preparing an exogenous polymer seed is familiar to a person skilled in the art and is typically accomplished by initially charging a reaction vessel with a relatively small amount of monomers and also with a relatively large amount of emulsifiers and admixing a sufficient amount of polymerization initiator at reaction temperature.

It is preferable for the purposes of the present invention to use an exogenous polymer seed having a glass transition temperature ≥50° C., frequently ≥60° C. or ≥70° C. and often ≥80° C. or ≥90° C. A polystyrene or polymethyl methacrylate polymer seed is particularly preferable.

The total amount of exogenous polymer seed may be initially charged to the polymerization vessel. But it is also possible to merely include a portion of the exogenous polymer seed with the initial charge to the polymerization vessel and to add the remainder during the polymerization together with monomers A to E. If necessary, however, the total polymer seed quantity may also be added during the polymerization. Preferably, the total amount of exogenous polymer seed is initially charged to the polymerization vessel before initiating the polymerization reaction.

The polymer solids content of the aqueous polymer P dispersions obtainable by the process according to the present invention is typically ≥10 and ≤70 wt %, frequently ≥20 and ≤65 wt % and often ≥25 and ≤60 wt %, all based on the aqueous polymer dispersion. The number average corpuscle diameter (cumulant z-average) as determined by quasi-elastic light scattering (ISO standard 13 321) is generally in the range ≥10 and ≤1000 nm, frequently in the range ≥10 and ≤700 nm and often in the range ≥50 to ≤400 nm.

One embodiment accordingly also comprehends the aqueous polymer P dispersions that are obtainable by the process described.

The aqueous polymer P dispersions of the present invention are very useful as a binder in the manufacture of adhesives, sealants, renders and paints and also in sand consolidation, as a component in the manufacture of textile or leather auxiliaries and impact modifiers and for modifying mineral binders and plastics.

The aqueous polymer P dispersions of the invention further provide simple access (by freeze or spray drying for example) to the corresponding polymer powders. These polymer powders, obtainable according to the present invention, are likewise useful as a binder in the manufacture of adhesives, sealants, renders and paints and also in sand consolidation, as a component in the manufacture of textile or leather auxiliaries and impact modifiers and for modifying mineral binders and plastics.

It is particularly advantageous, however, to use the aforementioned aqueous polymer P dispersions as binders for granular and/or fibrous substrates.

When the aforementioned aqueous polymer P dispersions are used as binders for granular and/or fibrous substrates, the aqueous binder compositions of the present invention may, as well as polymer P, additionally comprise still further components familiar to a person skilled in the art in terms of type and quantity, examples being thickeners, pigment dispersers, dispersants, emulsifiers, buffers, neutralizers, biocides, defoamers, polyol compounds having at least 2 hydroxyl groups and having a molecular weight ≤200 g/mol, film formation auxiliaries, pigments or fillers, etc.

Advantageously, however, the aqueous binder composition comprises ≤1 wt %, more advantageously ≤0.5 wt % of a polyol compound having at least 2 hydroxyl groups and having a molecular weight ≤200 g/mol, especially ≤150 g/mol, for example ethylene glycol, 1,2-propanediol, 1,3-propanediol, 1,2,3-propanetriol, 1,2-butanediol, 1,4-butanediol, 1,2,3,4-butanetetrol, diethanolamine, triethanolamine, etc., based on the overall amount of polymer P.

It is essential to the present invention that the total amount of additional formaldehyde-containing binder components in the aqueous binder composition is ≤50 parts by weight and advantageously ≤10 parts by weight per 100 parts by weight of polymer P. It is particularly advantageous for there not to be any formaldehyde-containing binder components in the binder composition of the present invention whatsoever.

Formaldehyde-containing binder components herein are to be understood as meaning binder components prepared using formaldehyde. The preparation of such formaldehyde-containing binder components frequently proceeds via a condensation reaction of a starting material with formaldehyde. The problem with these formaldehyde-containing binder components is that they may still comprise up to 20 000 ppm of unconverted formaldehyde and, what is more, may additionally evolve bound formaldehyde in the thermal treatment during the cure at a temperature ≤250° C. Examples of compounds of this type are the urea-formaldehyde resins, melamine-formaldehyde resins, phenol-formaldehyde resins, guanamine-formaldehyde resins, benzoguanamine-formaldehyde resins or acetoguanamine-formaldehyde resins that are familiar to a person skilled in the art.

The aqueous binder composition of the present invention is very useful as a binder for granular and/or fibrous substrates. The aqueous binder compositions referred to are therefore very useful in the manufacture of shaped articles from granular and/or fibrous substrates.

Granular and/or fibrous substrates are familiar to a person skilled in the art. In principle any organic or inorganic natural and/or synthetic granular and/or fibrous compounds whose longest dimension is ≤10 mm, preferably ≤5 mm and specifically ≤1 mm in the case of granular substrates and whose largest diameter is ≤1 mm, preferably ≤0.5 mm and specifically ≤0.1 mm in the case of fibrous substrates can be used in the invention.

Granular substrates may comprise for example white or colored pigmentary compounds, in particular titanium dioxide, zinc oxide, zinc sulfide, iron oxide, cadmium oxide, chromium oxide, lead oxide, iron sulfide, cadmium sulfide, chromium sulfide, lead sulfide and also lead molybdates or cobalt blue, or fillers (refractive index values <1.7), for example the naturally occurring fillers calcite, chalk, dolomite, kaolin, talc, mica, diatomaceous earth, barite or the synthetically produced fillers precipitated calcium carbonate or barium sulfate and also pyrogenous silica.

Fibrous substrates comprise natural fibers, such as vegetable, animal and mineral fibers, or manufactured fibers composed of natural or synthetic polymers. Examples of vegetable fibers are cotton fibers, flax fibers, hemp fibers, kenaf fibers, jute fibers, wood fibers or sisal fibers. Examples of animal fibers are wool or other animal hairs, and an example of mineral fibers is rock wool, an example of manufactured fibers with a natural origin is viscose fiber and examples of manufactured fibers based on synthetic polymers are polyester fibers, such as polytrimethylene terephthalate, polyethylene naphthalate, polyethylene terephthalate or polybutylene terephthalate fibers and also the various polycarbonate fibers, polyolefin fibers, in particular polyethylene or polypropylene fibers, polyamide fibers, such as polycaprolactam fibers (nylon-6), polyamide fibers from hexamethylenediamine and adipic acid (nylon-6,6), polyamide fibers from hexamethylenediamine and terephthalic acid (nylon-6,T), polyamide fibers from para-phenylenediamine and terephthalic acid (aramid) and also mineral fibers, such as glass fibers, carbon fibers or basalt fibers.

It will be appreciated that the term substrate in the context of the present document advantageously also comprehends webs obtainable from fibers, for example so-called mechanically consolidated, specifically needled, fiber webs or chemically prebonded fiber webs.

In the context of the present document, a fiber web is to be understood as meaning a sheetlike fibrous layer wherein fibers of finite length, continuous-filament fibers or yarns of any kind and any origin have been combined into a web and somehow joined together, in particular by mechanical consolidation or chemical prebonding.

The present invention employs with particular advantage fiber webs constructed of lignocellulosic fibers, such as cotton fibers, flax fibers, hemp fibers, kenaf fibers, jute fibers, wood fibers and/or sisal fibers or mixtures thereof with thermoplastic polymeric fibers, such as polyester or polyolefin fibers, or glass fiber webs. In one preferred embodiment fibers based on polyester and/or glass fibers are used.

Fiber webs useful for the purposes of the present invention generally have a basis weight of ≥10 and ≤3000 g/m², advantageously of ≥40 and ≤1000 g/m² and more advantageously of ≥50 and ≤500 g/m².

The process for producing a shaped article from a granular and/or fibrous substrate and the aqueous binder composition comprising an aqueous polymer P dispersion advantageously comprises applying the aqueous binder composition of the present invention atop a granular and/or fibrous substrate (by impregnation), optionally shaping the granular and/or fibrous substrate treated (impregnated) with the aqueous binder composition and then drying the granular and/or fibrous substrate thus obtained at a temperature above the glass transition temperature of polymer P.

Impregnating the granular and/or fibrous substrate generally takes the form of the aqueous binder composition being applied uniformly atop the surface of the fibrous and/or granular substrate. The amount of aqueous binder composition is chosen such that, per 100 g of granular and/or fibrous substrate, ≥1 g and ≤100 g, preferably ≥2 g and ≤50 g and more preferably ≥5 g and ≤30 g of polymer P are applied. The actual method of impregnating the granular and/or fibrous substrate is familiar to a person skilled in the art and is effected by drenching or spraying the granular and/or fibrous substrate with the aqueous binder composition of the present invention for example.

After impregnation, the granular and/or fibrous substrate is optionally formed into the desired shape, for example by introduction into a heatable press or mold. Thereafter, the shaped impregnated granular and/or fibrous substrate is dried in a conventional manner wherein polymer P undergoes filming.

The drying temperature is frequently ≥5° C., advantageously ≥10° C. and more advantageously ≥20° C. above the glass transition temperature of polymer P.

The shaped articles obtainable by the process according to the present invention have advantageous properties, in particular an improved level of heat resistance.

The aqueous binder compositions of the present invention, which comprise an aqueous polymer P dispersion, are accordingly particularly advantageous for use in the manufacture of fiber webs based on polyester and/or glass fiber, which in turn are particularly useful in the manufacture of bituminized roofing membranes.

The actual method of producing bituminized roofing membranes is familiar to a person skilled in the art and is more particularly effected by applying liquefied, optionally modified bitumen to one and/or both of the sides of a polyester and/or glass fiber web bonded with a binder composition of the present invention.

The examples which follow illustrate the invention and are nonlimiting.

EXAMPLES

I Preparation of Polymers P as their Aqueous Dispersions
Polymer Dispersion 1 (P1)

In a 2 L glass flask fitted with a stirrer and 4 metering devices, an initial charge of 262.9 g of deionized water, 43.8 g of a 20 wt % aqueous solution of a $C_{16}C_{18}$ fatty alcohol ethoxylate (Lutensol® AT 18, from BASF SE) and 12.3 mg of iron(II) sulfate heptahydrate, placed therein at 20 to 25° C. (room temperature) and under nitrogen blanketing, was heated up to 30° C. with stirring. This was followed by the simultaneous commencement of the continuous metered additions at constant flow rates of feed 1 in the form of a homogeneous aqueous emulsion and also of feeds 2 and 3 in the form of aqueous solutions for a period of 4.0 hours. Within 20 minutes of the commencement of feeds 1, 2 and 3, the temperature of the aqueous polymerization mixture was raised from 30 to 70° C.

Feed 1:

| | |
|---|---|
| 713.9 g | of vinyl acetate |
| 95.4 g | of n-butyl acrylate |
| 43.8 g | of glycidyl methacrylate |
| 17.5 g | of acrylic acid |
| 17.5 g | of a 25 wt % aqueous solution of vinylsulfonate |
| 20.5 g | of a 32 wt % aqueous solution of a $C_{12}C_{14}$ alkyl polyglycol ether sulfate sodium salt (Disponil® FES 77, from BASF SE) |
| 32.8 g | of a 20 wt % aqueous solution of a $C_{16}C_{18}$ fatty alcohol ethoxylate (Lutensol® AT 18) |
| 252.6 g | of deionized water |

Feed 2:

| | |
|---|---|
| 105.0 g | of a 2.5 wt % aqueous solution of sodium peroxodisulfate |

Feed 3:

| | |
|---|---|
| 43.7 g | of deionized water |
| 1.8 g | of sodium acetate |
| 1.5 g | of sodium hydroxylmethylsulfonate (Rongalit® C, from BASF SE) |

On completion of feeds 1 to 3, 68.3 g of deionized water and 13.7 g of a 32 wt % aqueous solution of $C_{12}C_{14}$ alkyl polyglycol ether sulfate sodium salt (Disponil® FES 77) were added to the polymerization mixture in the course of 10 minutes by continuous metered addition at constant flow rates. The polymerization mixture was subsequently allowed to undergo secondary polymerization at 70° C. for 30 minutes. This was followed by the simultaneous commencement of the continuous metered additions at constant flow rates and constant temperature of 21.0 g of a 10 wt % aqueous solution of tert-butyl hydroperoxide and 29.4 g of a 13.1 wt % aqueous solution of acetone bisulfite (1:1 addition product of acetone and sodium hydrogensulfite) over one hour for the purpose of residual monomer removal. The aqueous polymer dispersion was subsequently cooled down to room temperature and then admixed with 5.3 g of a 7.5 wt % aqueous solution of Acticid® MBS and also 1.6 g of a 1.5 wt % aqueous solution of Acticid® MV (product from Thor GmbH). pH 5.0 was set by admixture of 10 wt % aqueous sodium hydroxide solution. The aqueous polymer dispersion obtained was finally filtered through a 500 μm filter.

The aqueous polymer dispersion thus obtained had a solids content of 50.7 wt % based on the total weight of the aqueous dispersion. The number average corpuscle diameter was found to be 169 nm. The glass transition temperature of the polymer was found to be 34.2° C.

Solids contents were generally determined by drying a defined amount of the aqueous polymer dispersion (about 0.8 g) using the HR73 moisture determinator from Mettler Toledo at a temperature of 130° C. to constant weight (for about 2 hours). Two measurements were carried out in each case. The value reported in each case is the average of these measurements.

Number average corpuscle diameters for the polymer corpuscles were generally determined by dynamic light scattering on a 0.005 to 0.01 weight percent aqueous polymer dispersion at 23° C. using an Autosizers 110 from Malvern Instruments, England. The reported value is the cumulant z-average of the measured autocorrelation function (ISO standard 13321).

The general procedure for determining their glass transition temperature was to apply the aqueous polymer dispersions in a thickness of about 1 mm to a Teflon foil and to dry the resulting films at 23° C. and 50% relative humidity (standard conditions) for 24 hours. The glass transition temperature was generally determined using a Q 2000 differential scanning calorimeter from TA Instruments. The polymer films obtained were typically used at an initial weight of about 8.5 mg. Heating rate was 20 K per minute. The second heating curve in each case was detected and evaluated according to the mandates of ISO 11357-2.

Comparative Dispersion 1 (V1)

V1 was prepared similarly to P1 except that 112.9 g of n-butyl acrylate were used in feed 1 instead of 95.4 g. Nor was any acrylic acid used.

The aqueous comparative dispersion obtained had a solids content of 50.7 wt % based on the total weight of the aqueous dispersion. The number average corpuscle diameter was found to be 129 nm and the glass transition temperature 28.4° C.

Comparative Dispersion 2 (V2)

V2 was prepared similarly to P1 except that 99.8 g of n-butyl acrylate were used in feed 1 instead of 95.4 g. Nor was any vinylsulfonic acid used.

The aqueous comparative dispersion obtained had a solids content of 50.3 wt % based on the total weight of the aqueous dispersion. The number average corpuscle diameter was found to be 184 nm and the glass transition temperature 33.1° C.

Comparative Dispersion 3 (V3)

V3 was prepared similarly to P1 except that 130.4 g of n-butyl acrylate and 26.3 g of acrylic acid were used in feed 1 instead of 95.4 g and 17.5 g, respectively. Nor was any glycidyl methacrylate used.

The aqueous comparative dispersion obtained had a solids content of 50.8 wt % based on the total weight of the aqueous dispersion. The number average corpuscle diameter was found to be 194 nm and the glass transition temperature 28.7° C.

Comparative Dispersion 4 (V4)

V4 was prepared similarly to P1 except that feed 1 utilized 495.3 g of methyl methacrylate and 713.9 g of vinyl acetate and 314.0 g of n-butyl acrylate instead of 95.4 g. No vinyl acetate was used.

The polymerization had to be discontinued after 2 hours and 15 minutes on account of noticeable fouling.

II Production of Bonded Fiber Webs and Performance Testing

Bonded fiber webs were produced from a base web comprising a needled polyethylene terephthalate spunbonded (400 cm length, 40 cm width) having a basis weight of 125 g/m$^2$.

Binder liquors were produced by diluting aqueous polymer dispersion P1 and also comparative dispersions Vito V3 with deionized water to a solids content of 13 wt %. In what follows, the binder liquors obtained are referred to as binder liquors BP1 and also BV1 to BV3.

The base webs producing the bonded fiber webs were drenched with the respective binder liquor BP1 and also BV1 to BV3 in the machine direction in an HVF impregnator with pad-mangle from Mathis (rubber roll Shore A=85°/steel roll). The wet pickup was in each case adjusted to 192.3 g of binder liquor per square meter (corresponding to a solids add-on of 25 g/m$^2$). The impregnated fiber webs obtained were subsequently dried and bonded in a Fleissner industrial dryer at 200° C. for 3 minutes. The bonded fiber webs obtained on cooling down to room temperature are referred to as fiber webs F1 and also FV1 to FV3 in accordance with the binder liquors used.

Determination of Heat Resistance

The heat resistance of fiber webs F1 and FV1 to FV3 was determined on the lines of DIN 18192 by measuring the extension in the machine direction and the shrinkage in the cross direction at 200° C. To this end, 100×360 mm strips were die-cut out of the fiber webs in the machine direction. Marks were made in the center on each of the fiber web strips at points respectively located 130 mm away from the two narrow sides, the marks defining a measuring sector of 100±0.2 mm there between. In the middle of the measuring sector the width of the fiber web strip was checked by measurement. Thereafter, the narrow ends were fixed in clamping rails such that a clamped length of 300 mm arose. Concurrently therewith, the tripod required for measurement and also a stainless steel cylinder 4 kg in weight were heated to 200° C. in a drying cabinet. To perform the test, then, the marked and measured fiber web strips were attached with one of the clamping rails to the tripod in the drying cabinet to hang down freely.

The 4 kg stainless steel cylinder was then suspended from the lower clamping rail, the door of the drying cabinet was closed and the fiber web thus clamped was left at 200° C. in the drying cabinet for 10 minutes. Thereafter, the laboratory tripod together with the weighted fiber web strip was taken from the drying cabinet and left to cool down at room temperature for 5 minutes. Thereafter, the stainless steel cylinder was first taken off the lower clamping rail and then the upper clamping rail was taken off the tripod (the tripod and the stainless steel cylinder were put back in the drying cabinet for conditioning for the next measurement). After the upper and lower clamping rails had been removed, the fiber web strip was laid flat on the laboratory table and the respective distance between the two applied marks (in the machine direction) and also the respective width at the narrowest place (in the cross direction) of the fiber web strips were measured. In each case, measurements were carried out on 9 separate measuring strips. The values reported in table 1 represent the averages of these measurements. The lower the extension in the machine direction and the lower the shrinkage in the cross direction, the better the results. The reported particulars are the change in the machine or cross direction in percent, based on the corresponding distances before the thermal/mechanical treatment.

TABLE 1

Results of heat resistance test at 200° C.

| Fiber web | Extension [in %] | Shrinkage [in %] |
| --- | --- | --- |
| F1 | 3.9 | −5.6 |
| FV1 | >10 | <−15 |

TABLE 1-continued

Results of heat resistance test at 200° C.

| Fiber web | Extension [in %] | Shrinkage [in %] |
|---|---|---|
| FV2 | 5.6 | −8.3 |
| FV3 | >10 | <−15 |

It is clearly apparent from the results that the fiber web produced using the inventive binder liquor BP1 has improved heat resistance at 200° C. compared with binder liquors BV1 to BV3.

We claim:

1. A process for producing an aqueous dispersion comprising a polymer P, the process comprising:
    conducting a free-radically initiated aqueous emulsion polymerization of a mixture comprising ethylenically unsaturated compounds,
    wherein the mixture comprises
    ≥0.5 and ≤4.0 wt % of at least one α,β-monoethylenically unsaturated $C_3$ to $C_6$ monocarboxylic acid or dicarboxylic acid, as a monomer A,
    ≥2.0 and ≤8.0 wt % of at least one monoethylenically unsaturated compound having at least one epoxy group, as a monomer B,
    ≥0.1 and ≤1.5 wt % of at least one monoethylenically unsaturated compound having at least one sulfonic acid group, as a monomer C,
    ≥75 and ≤85 wt % of at least one ester obtained from vinyl alcohol and a $C_1$ to $C_5$ monocarboxylic acid, as a monomer D, and
    ≥0.1 and ≤20 wt % of at least one ethylenically unsaturated compound other than the monomers A to D, as a monomer E, and
    wherein the amounts of the monomers A to E sum to 100 wt %, for the polymerization.

2. The process according to claim 1, wherein the at least one monomer A is at least one selected from the group consisting of acrylic acid, methacrylic acid, crotonic acid, fumaric acid, maleic acid, maleic anhydride, 2-methylmaleic acid and itaconic acid.

3. The process according to claim 1, wherein the at least one monomer B is at least one selected from the group consisting of vinyloxirane, allyloxirane, glycidyl acrylate and glycidyl methacrylate.

4. The process according to claim 1, wherein the at least one monomer C is at least one selected from the group consisting of vinylsulfonic acid and 2-acrylamido-2-methylpropanesulfonic acid.

5. The process according to claim 1, wherein the at least one monomer D is at least one selected from the group consisting of vinyl acetate and vinyl propionate.

6. The process according to claim 1, wherein the at least one monomer E is at least one selected from the group consisting of an olefin,
    a conjugated aliphatic $C_4$ to $C_9$ diene,
    an ester obtained from vinyl alcohol and a $C_6$ to $C_{18}$ monocarboxylic acid,
    a $C_1$ to $C_{10}$ alkyl acrylate,
    a $C_1$ to $C_{10}$ alkyl methacrylate,
    a $C_5$ to $C_{10}$ cycloalkyl acrylate,
    a $C_5$ to $C_{10}$ cycloalkyl methacrylate,
    a $C_1$ to $C_{10}$ dialkyl maleate,
    a $C_1$ to $C_{10}$ dialkyl fumarate,
    a vinylaromatic monomer,
    a mono- or dinitrile of an ethylenically unsaturated $C_3$ to $C_6$ mono- or dicarboxylic acid, and
    a mono- or dicarboxamide of an ethylenically unsaturated $C_3$ to $C_6$ mono- or dicarboxylic acid.

7. The process according to claim 1, wherein the mixture comprises
    ≥0.5 and ≤3.0 wt % of the at least one monomer A,
    ≥3.0 and ≤7.0 wt % of the at least one monomer B,
    ≥0.1 and ≤1.0 wt % of the at least one monomer C,
    ≥78 and ≤83 wt % of the at least one monomer D, and
    ≥5.0 and ≤15 wt % of the at least one monomer E.

8. The process according to claim 1, wherein
    the monomer A is acrylic acid, methacrylic acid, or both,
    the monomer B is glycidyl acrylate, glycidyl methacrylate, or both,
    the monomer C is vinylsulfonic acid,
    the monomer D is vinyl acetate, and
    the monomer E is n-butyl acrylate, 2-ethylhexyl acrylate, or both.

9. The process according to claim 1, wherein the polymer P has a glass transition temperature of ≥20° C. and ≤40° C., as determined by ISO 11357-2:2013.

10. A method of producing a composition, the method comprising:
    obtaining an aqueous polymer dispersion by the process according to claim 1,
    optionally drying the aqueous polymer dispersion, thereby obtaining a polymer powder, and
    producing the composition with the aqueous polymer dispersion, the polymer powder, or both,
    wherein the composition is at least one selected from the group consisting of a binder in the manufacture of adhesives, sealants, renders and paints, a binder in sand consolidation, a component in the manufacture of textile or leather auxiliaries and impact modifiers for modifying mineral binders and plastics.

11. A process for producing a shaped article from a substrate, the process comprising:
    obtaining an aqueous polymer dispersion by the process according to claim 1,
    applying the aqueous polymer dispersion to the substrate to form a treated substrate, and
    drying the treated substrate at a temperature above the glass transition temperature of the polymer P to form a shaped article,
    wherein the substrate is a granular substrate, a fibrous substrate, or both.

12. The process according to claim 11, wherein an amount of aqueous binder composition is present during the applying such that ≥1 and ≤100 g of the polymer P is present per 100 g of the substrate after the applying.

13. The process according to claim 11, further comprising:
    shaping the treated substrate after the applying of the aqueous polymer dispersion.

14. The process according to claim 1, wherein the monomer E is not ethene.

* * * * *

UNITED STATES PATENT AND TRADEMARK OFFICE
CERTIFICATE OF CORRECTION

PATENT NO. : 10,544,249 B2
APPLICATION NO. : 15/303313
DATED : January 28, 2020
INVENTOR(S) : Lucia Jimenez Garcia et al.

It is certified that error appears in the above-identified patent and that said Letters Patent is hereby corrected as shown below:

In the Specification

Column 2, Line 54, "p-acetoxystryrene," should read -- p-acetoxystyrene, --.

Column 3, Line 17, "methylenebisacrylami de," should read -- methylenebisacrylamide, --.

Column 4, Line 22 (approx.), "it" should read -- ff. --.

Column 6, Line 40, "N-Iaurylpyridinium" should read -- N-laurylpyridinium --.

Column 6, Line 59, "tetraphenyl borate," should read -- tetraphenylborate, --.

Column 7, Line 28, "p-mentyl" should read -- p-methyl --.

Column 7, Line 47, "ammoniosulfate" should read -- ammoniumsulfate --.

Column 15, Line 7, "110" should read -- IIC --.

Column 15, Line 64, "Vito" should read -- V1 to --.

Signed and Sealed this
Second Day of June, 2020

Andrei Iancu
*Director of the United States Patent and Trademark Office*